United States Patent Office 3,207,755
Patented Sept. 21, 1965

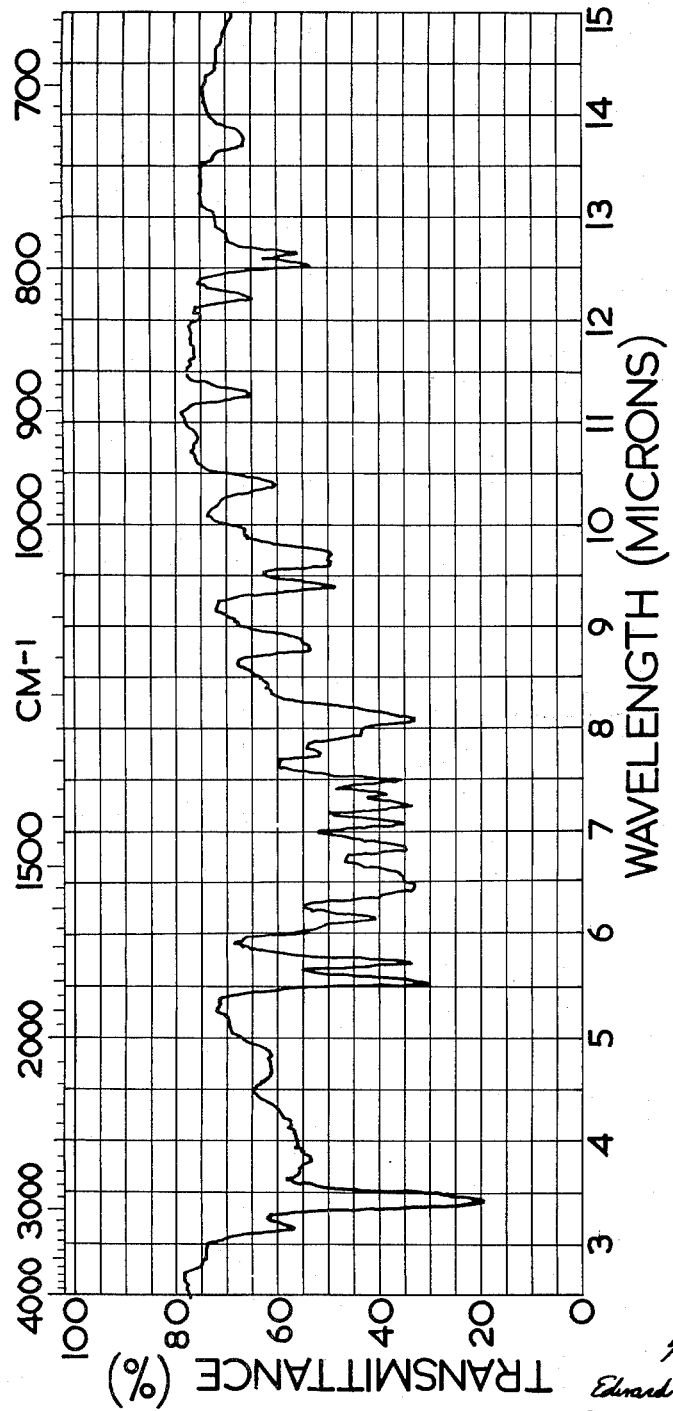

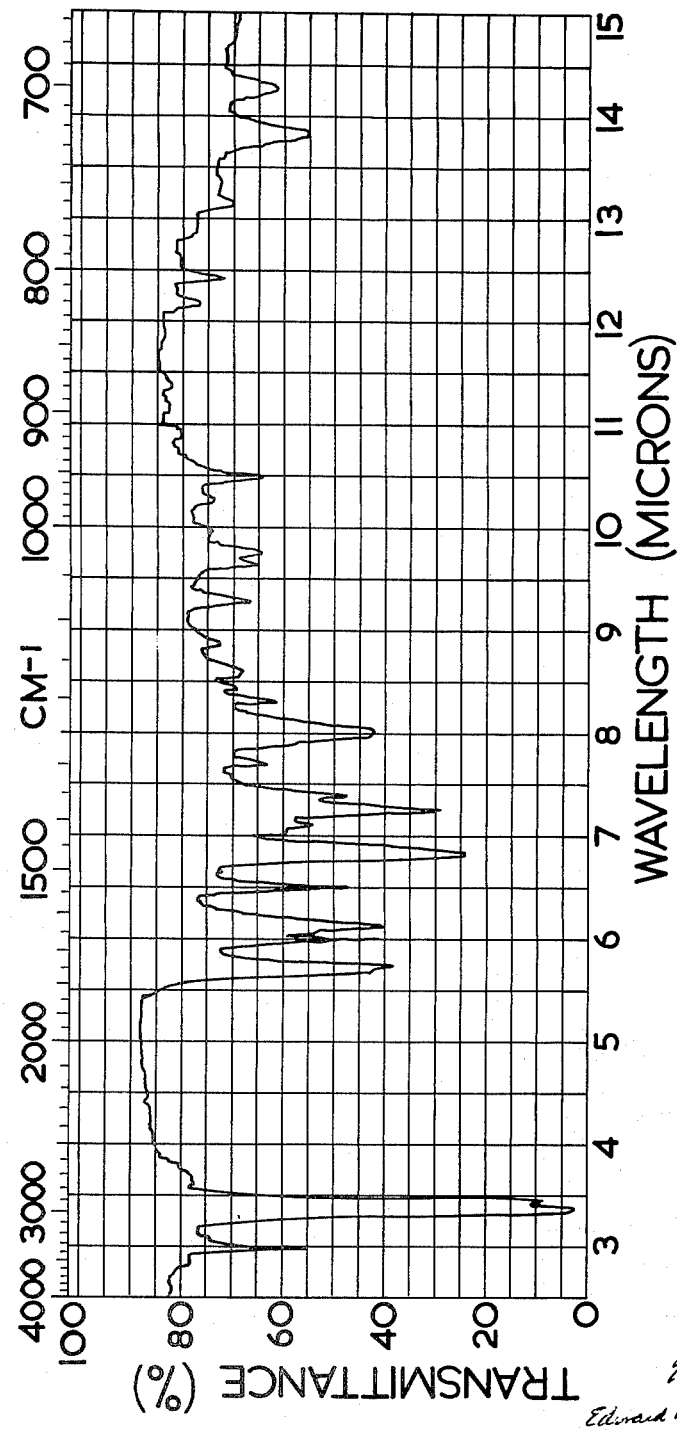

3,207,755
TRANSFORMATION PRODUCTS OF CEPHALO-
SPORIN C AND DERIVATIVES THEREOF
Edward Penley Abraham and Guy Geoffrey Frederick
Newton, Oxford, England, assignors to National Research Development Corporation, London, England, a British company
Filed July 26, 1960, Ser. No. 45,364
Claims priority, application Great Britain, Aug. 4, 1959,
26,569/59; Jan. 20, 1960, 2,135/60
6 Claims. (Cl. 260—243)

This invention relates to transformation products of Cephalosporin C, and to derivatives thereof, and to methods for the preparation of such compounds.

In U.K. patent specification No. 810,196, there is described a process for the separation of Cephalosporin C from the products of a fermentation process using a species of Cephalosporium. At the date of the said application, the structure of Cephalosporin C was unknown, and this handicapped work on the preparation and identification of transformation products and derivatives of Cephalosporin C which might also show useful biological activities.

Some work has been carried out, however, on the acid treatment of Cephalosporin C. Thus, the inventors in the present application, Newton and Abraham, in the Biochemical Journal, vol. 62, pages 651–657, state the Cephalosporin C is relatively stable to acid, losing no detectable activity on standing in 0.1 N hydrochloric acid at room temperature for 4 hours. Similarly Newton and Abraham, in Nature, vol. 175, page 548, state that Cephalosporin C is stable in aqueous solution at pH 2.5 at room temperature. There is also described in this publication the hydrolysis of Cephalosporin C with acid, Cephalosporin C yielding one mole of carbon dioxide and D-α-aminoadipic acid. This acid treatment, which was in point of fact carried out using hot concentrated hydrochloric acid for a length of time in the region of 18 hours, broke down the Cephalosporin C molecule and destroyed all the activity thereof.

In the Ciba Foundation Symposium on Amino Acids and Peptides with Antimetabolic Activity, 1958, pp. 205–223, the preparation of several active compounds from Cephalosporin C is described. Thus, it is disclosed that the treatment of Cephalosporin C with 0.1 N hydrochloric acid at 20° C. yields at least two acidic and three neutral compounds all of which are ninhydrin-positive.

The neutral compounds are readily separated from each other on paper chromatograms run in butanol-acetic acid-water (4:1:4). One of them ($R_F$ 0.15) shows antibacterial activity and has been named Cephalosporin $C_c$. The preparation and properties of Cephalosporin $C_c$ are described in more detail in co-pending U.S. Application Serial No. 798,855, now Patent No. 3,049,541 granted August 14, 1962. Thus, in the table on page 3 of this specification the yield of Cephalosporin $C_c$ obtained under various acid conditions is described.

Nothing is said in the Symposium about the acidic products of hydrolysis except that they are ninhydrin-positive in the concentrations obtained by acid treatment of Cephalosporin C with 0.1 N hydrochloric acid at 20° C. The length of time for which the acid treatment was carried out before the separation of these hydrolysis products is not given in the publication but the inventors in this application, who are also the authors of this publication confirm that the actual time of the treatment was in the range of from 6 to 9 days.

The inventors have now established the structure of Cephalosporin C, and have also discovered that, by treating Cephalosporin C with acid under certain conditions, the Cephalosporin C molecule may be split into two parts i.e. a complex nucleus and a side chain which is α-amino-adipic acid, and is attached to the complex nucleus at the 7-position thereof (the 7-position being as hereinafter defined). In this specification, compounds having a structure of this type i.e. a complex nucleus having the basic ring structure of the Cephalosporin C nucleus and an α-aminoadipic acid side chain attached to it in the 7-position, are referred to as having the nucleus/side chain type of structure. The biological properties of Cephalosporin C are dependent in the main upon the more complex structure of the nucleus, and the inventors expected that, by the addition of other side chains to the nucleus using chemical techniques known per se, derivatives of the nucleus might be prepared showing similar but modified or perhaps increased activity to that of Cephalosporin C itself. They therefore appreciated that the discovery of the nucleus/side-chain type of structure for Cephalosporin C and of a method of separating and isolating the nucleus is of great importance in the field of antibiotics.

Apart from Cephalosporin C, there are certain transformation products thereof which have already been prepared and identified and which we have found also to have the nucleus/side-chain type of structure. One such compound is Cephalosporin $C_c$, reference to which has been made above. Other such compounds are described in co-pending U.S. application Serial No. 799,343 now abandoned in favor of continuation-in-part application Serial No. 254,558 filed January 25, 1963, i.e. antibiotic substances which are transformation products of Cephalosporin C and are referred to as Cephalosporin $C_A$ compounds. These may be obtained by treatment of Cephalosporin C in aqueous solution with a weak, tertiary base, for example pyridine, collidine or quinoline. If pyridine is used, the resultant antibiotic is referred to as Cephalosporin $C_A$ (pyridine).

According to the invention, therefore, there is provided a process for the preparation of a compound selected from the group consisting of the nucleus of Cephalosporin C, the nucleus of Cephalosporin $C_c$ and the nucleus of a Cephalosporin $C_A$ compound comprising the steps of treating a compound selected from the group consisting of Cephalosporin C, Cephalosporin $C_c$ and a Cephalosporin $C_A$ compound with acid under such conditions and for such a length of time that cleavage of the side-chain from the nucleus occurs and isolating the nucleus from the hydrolysis products of the reaction. It will be appreciated that the term acid includes within its scope acidic ion exchange materials. The nuclei can be obtained in their free form, rather than in the form of their acid salts by adjustment of the pH of the solution. For instance, when the solution is adjusted to a pH of about 4.5, then free nuclei can be isolated therefrom.

The hydrolysis is preferably carried out using dilute mineral acid, and dilute hydrochloric acid has been found to be especially suitable. Other convenient acids are sulphonic acids and sulphonated polystyrene resins. In carrying out the process, the acid-treated solution containing Cephalosporin C, Cephalosporin $C_c$ or a Cephalosporin $C_A$ compound is usually allowed to stand until a relatively high yield of nucleus has been obtained, a time dependent upon the severity of the conditions but normally of the order of a few days. The nucleus can then be separated from the reaction products by methods known per se, for example paper electrophoresis and/or paper chromatography. In using these techniques, the separated nucleus can usually be identified on the paper by the characteristic of showing no antibiotic activity itself at the concentrations used (tested by placing electrophoresis paper in contact with plates seeded with *Staphylococcus aureus* [Oxford Strain]) but having activity after treatment with phenylacetyl chloride to cause phenylacetylation. This treatment can conveniently be carried out by first spraying the paper with M-pyridine in 50% acetone followed by phenylacetyl chloride (1.25% v./v.) in acetone. The phenylacetyl derivative can be separated by chromatographic and electrophoretic means.

In one embodiment of the invention, the Cephalosporin $C_c$ which is treated with acid under such conditions and for such a length of time that cleavage of the side chain from the nucleus occurs is prepared in situ from Cephalosporin C. This acid treatment of Cephalosporin C, as disclosed in copending U.S. application Serial No. 798,855, now Patent No. 3,049,541 granted August 14, 1962, gives Cephalosporin $C_c$ and, by continuing the acid treatment beyond the optimum conditions for the production of Cephalosporin $C_c$ the optimum conditions for the production of the nucleus of Cephalosporin $C_c$ are reached. It has been found, since the filing of the said U.S. application Serial No. 798,855 that .5 N to N hydrochloric acid for less than 1 day are the preferred conditions for the production of Cephalosporin $C_c$ and thus preferred conditions for the production of the nucleus thereof involve the treatment of Cephalosporin C with from .5 N to N hydrochloric acid for from 2 to 4 days.

In a further embodiment of the invention, nuclei of Cephalosporin $C_A$ compounds are prepared by a method comprising the steps of treating Cephalosporin C with acid to form the nucleus of Cephalosporin C and then treating the nucleus so formed with a weak tertiary base to form the nucleus of Cephalosporin $C_A$.

The reaction conditions for the preparation of the nuclei of Cephalosporin C, $C_c$ and $C_A$ from Cephalosporin C, $C_c$ and $C_A$ respectively can be varied considerably but a preferred method has been found to involve the use of hydrochloric acid of strength in the range of about pH 0 to 2.5 at a temperature in the range of about $-10°$ C. to $+50°$ C. for a length of time in the range of about 12 hours to 30 days, the conditions being arranged within these limits so as to provide a high yield of hydrolysis products. An eminently suitable method involves the use of 0.1 N hydrochloric acid at a temperature of about 20° C. for about 3 days.

On treating Cephalosporin C with acid, of strength in the range as hereinbefore defined, at least two reactions commence. These are (1) the hydrolysis of Cephalosporin C to cleave the bond joining the nucleus to the side chain, (2) the reaction of acid with the Cephalosporin C molecule to produce Cephalosporin $C_c$. Moreover, once some Cephalosporin $C_c$ is produced in the reaction mixture, a third reaction commences i.e. the hydrolysis of Cephalosporin $C_c$ to cleave the bond joining the Cephalosporin $C_c$ nucleus to the side-chain. In addition some Cephalosporin $C_c$ nucleus is formed by reaction of acid with the Cephalosporin C nucleus. Thus, if the treatment of Cephalosporin C with acid is carried out with the purpose of obtaining the nucleus of Cephalosporin C, the conditions of the reaction are chosen to provide a relatively high proportion of Cephalosporin C nucleus and a relatively low proportion of Cephalosporin $C_c$ nucleus. Similarly, if the reaction is carried out for the purpose of obtaining the nucleus of Cephalosporin $C_c$, the conditions of the reaction are chosen to provide a relatively high proportion of Cephalosporin $C_c$ nucleus. The most suitable conditions for the reactions can be established by simple experiment, and we have found that, starting with Cephalosporin C, .1 N hydrochloric acid at 20° C. for about 3 days provides a good yield of the Cephalosporin C nucleus and .5 to 1 N hydrochloric acid at 20° C. for about 3 days provides a good yield of the Cephalosporin $C_c$ nucleus. The conditions can be contrasted with the .1 N hydrochloric acid at 20° C. for about 5 days by which time from the Table 3 in co-pending U.S. application Serial No. 798,855, now Patent No. 3,049,541 granted Aug. 14, 1962, the best yelds of Cephalosporin $C_c$ which can be obtained by using .1 N hydrochloric acid are obtained and, by which time also, the Cephalosporin C nucleus formed at an earlier stage has virtually disappeared.

It will be appreciated that the nucleus of Cephalosporin C was not one of the acidic compounds detected but not characterised in the Ciba symposium hereinbefore discussed for the following reasons. First, after treatment of Cephalosporin C with .1 N hydrochloric acid at 20° C. for upwards of 5 days, it can be assumed that virtually no Cephalosporin C nucleus remained. The optimum conditions for obtaining the nucleus of Cephalosporin C are .1 N hydrochloric acid for 3 days and the time range over which significant yields of nucleus are obtained is narrow. Thus, after upwards of 5 days, virtually no Cephalosporin C nucleus would have remained in the solution. Secondly, subsequent experience has shown that the nucleus of Cephalosporin C would not have been present in quantities sufficient to give a positive ninhydrin reaction even if the treatment had only lasted for the optimum time of 3 days. Under these optimum conditions, the nucleus was detected at a later date by phenylacetylation and a subsequent activity test as hereinbefore defined. In any case, even when a solution containing the nucleus of Cephalosporin C is concentrated to such an extent that a ninhydrin-positive reaction should occur to a detectable degree, the typical blue or purple colour is not obtained. Instead a yellowish-brown colour is obtained. Thus the Cephalosporin C nucleus is not ninhydrin-positive in the accepted sense.

Further according to the invention, there is provided the nucleus of Cephalosporin C, being a transformation product of Cephalosporin C which has been named 7-aminocephalosporanic acid, and which has the structure

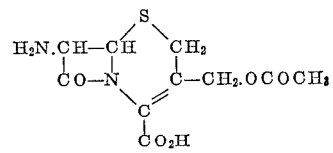

and the sodium, potassium, ammonium and strong acid salts thereof. Of particular importance are the nucleus itself and the mineral acid salts, especially the hydrochloride. It will be understood that the nucleus has a similar steric structure to the corresponding part of Cephalosporin C obtained by fermentation from the Cephalosporium. The nucleus itself can be further identified by the following properties after phenylacetylation as hereinbefore described:

(1) The Cephalosporin C nucleus fraction of the preparation migrates slightly faster than Cephalosporin C towards the anode on electrophersis at pH 7 (with aqueous collidine acetate as solvent).

(2) The Cephalosporin C nucleus fraction migrates about half as fast as Cephalosporin C towards the anode at pH 4.5 (with aqueous pyridine acetate as solvent).

(3) The Cephalosporin C nucleus fraction remains near the point of origin on electrophoresis at pH 4.0 (in aqueous pyridine acetate), showing only a relatively small migration towards the anode. Under these conditions Cephalosporin C still migrates to the anode almost as rapidly as at pH 7.

(4) After electrophoresis in 10% acetic acid, elution from the paper and hydrolysis in N HCl at 105° for 16 hours it yielded some glycine (50 μg. giving a spot of similar intensity to the glycine spot obtained on hydrolysis of 50 μg. of Cephalosporin C) but no α-aminoadipic acid. It thus did not contain the side-chain of the Cephalosporin C molecule.

(5) The Cephalosporin C nucleus fraction shows an $R_F$ similar to that of N-phenylacetyl Cephalosporin C (0.08–0.15) in butanol-ethanol-water (4:1:5 by vol.).

(6) After chromatography in butanol-ethanol-water, or after electrophoresis, and then being sprayed on the paper with penicillinase in 0.1% gelatin solution (concentration of enzyme 10 times that required to inactivate a spot of 50 μg. of benzylpenicillin) it yields a spot of apparently undiminished activity when sprayed with phenylacetyl chloride and pyridine.

(7) When spotted on to paper, sprayed with pyridine acetate pH 7 (2 M to pyridine), suspended while damp over the vapor of a solution of 2 M-pyridine acetate at 37° for 16 hours, dried, subjected to electrophoresis at pH 7, and then phenylacetylated, an active spot (due to the phenylacetyl derivative of Cephalosporin $C_A$ (pyridine) nucleus) appears in the neutral position as well as a spot in a position slightly nearer the anode than that occupied by Cephalosporin C.

(8) After electrophoresis on paper, the nucleus gave a yellowish-brown color with ninhydrin which later changed to grey-blue (6-aminopenicillanic acid has been reported not to give a normal ninhydrin color).

After paper electrophoresis or chromatography, it could be readily detected (like Cephalosporin C) as a dark absorbing spot by placing the paper before a source of ultra-violet light.

Further according to the invention there is provided the nucleus of Cephalosporin $C_c$, being a transformation product of Cephalosporin C and being the lactone of desacetyl-7-aminocephalosporanic acid and having the following structure

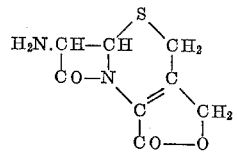

and strong acid salts thereof. Of particular importance are the nucleus itself and the mineral acid salts, particularly the hydrochloride. It will be understood that, as in the case of the nucleus of Cephalosporin C the steric structure of the molecule is similar to that of the corresponding part of Cephalosporin C obtained by fermentation from the Cephalosporium. This compound can be further identified by means of the following properties of the nucleus after phenylacetylation:

(1) On electrophoresis on paper in pyridine acetate buffer, (pH 4.5), the Cephalosporin $C_c$ nucleus moves approximately the same distance towards the cathode as the Cephalosporin C nucleus moves towards the anode.

(2) On electrophoresis on paper with 10% acetic acid buffer, the Cephalosporin $C_c$ nucleus migrates towards the cathode two and a half times as fast as Cephalosporin C nucleus.

(3) On chromatography in butanol-ethanol-water (4:1:5 by vol.) the $R_F$ factor of the Cephalosporin $C_c$ nucleus derivative is 0.33, compared with 0.08–0.15 for that of Cephalosporin C and 0.08 for the Cephalosporin $C_A$ nucleus.

Further according to the invention, there are provided nuclei of Cephalosporin $C_A$ being transformation products of Cephalosporin C having the following structure:

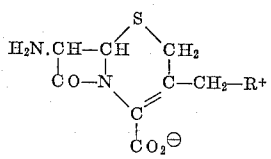

in which R+ represents a weak tertiary base as defined in co-pending U.S. application Serial No. 799,343 namely, pyridine, nicotinamide, nicotinic acid, collidine, quinoline, pyrimidines, thiazoles and sulphonamide derivatives thereof, such as sulphadiazine, sulphathiazole and sulphapyridine, and strong acid salts thereof. Of particular importance are the nucleus itself and the mineral acid salts, especially the hydrochloride.

Again it will be understood that the steric structure is similar to that of the corresponding part of Cephalosporin C obtained by fermentation from the Cephalosporin. The preferred tertiary base is pyridine and the nucleus in which R+ represents pyridine, can be further identified from the following properties:

(1) On paper electrophoresis at pH 4.0 in pyridine acetate buffer, the Cephalosporin $C_A$ nucleus moves a similar distance towards the cathode as Cephalosporin C moves towards the anode. When electrophoresis was carried out in 10% acetic acid, the Cephalosporin $C_A$ nucleus moved about twice as fast towards the cathode as did Cephalosporin $C_A$ (pyridine).

(2) Cephalosporin $C_A$ (pyridine) nucleus is not destroyed by the action of penicillinase under conditions which completely destroy 50 µg. of penicillin G.

(3) Cephalosporin $C_A$ (pyridine) nucleus is distinguished from Cephalosporin $C_c$ nucleus on paper chromatograms run with n-butanol-ethanol-water (4:1:5 by volume).

The compounds of the invention as hereinbefore defined i.e. the nuclei of Cephalosporin C, $C_c$ and $C_A$, are especially important as they are intermediates from which further derivatives may be prepared having biological activity.

According to a further embodiment of the invention therefore, there are provided antibiotically active derivatives of Cephalosporin C which may be prepared from the nuclei of Cephalosporin C, Cephalosporin $C_c$ and Cephalosporin $C_A$ which comprise substituted acetyl derivatives of the aforementioned nuclei, said derivatives having a structure of the general formula:

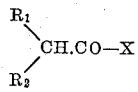

in which X represents the nucleus of Cephalosporin C, Cephalosporin $C_c$ or Cephalosporin $C_A$ linked to the $R_1$, $R_2$ CH.CO group through its 7-position, and $R_1$, $R_2$ represent hydrogen, an alkyl group, a phenyl group, a substituted phenyl group or a group of structure $R_3$—O—, in which $R_3$ represents an alkyl group, a phenyl group or a substituted phenyl group, and are the same or different. These compounds have considerable biological activity. For instance, the phenylacetyl derivative of the Cephalosporin C nucleus has an activity of about 1,000 units/mg. in the degree of purity hitherto obtained. Its biological spectrum is given in Example 2. The phenoxyacetyl derivative of the Cephalosporin C nucleus has been found to have similar activity to the phenylacetyl derivative, and the benzoyl, n-propionyl, isobutyryl acetyl derivatives and the acetyl derivative itself have all been shown to have biological activity. The activity of the phenylacetyl derivative of Cephalosporin $C_A$ (pyridine) has not as yet been determined but, as Cephalosporin $C_A$ (pyridine) is more active than Cephalosporin C, it is expected that the activity of the phenylacetyl derivative thereof will be high.

Other aryl derivatives which are of importance are the benzyloxycarbonyl, hexanoyl, hexahydrobenzoyl, p-nitrophenylacetyl and p-nitrophenoxyacetyl derivatives.

Further according to the invention, there is provided a process for the production of the aforementioned substituted acetyl derivative of the nuclei of Cephalosporin C, $C_c$ and $C_A$ comprising treating a compound selected from the group consisting of Cephalosporin C, Cephalosporin $C_c$ and a Cephalosporin $C_A$ compound with acid under such conditions and for such a length of time that cleavage of the nucleus from the side chain occurs and treating the nucleus so formed with the appropriate aryl chloride. For the production of the phenylacetyl derivatives of the Cephalosporin C, $C_c$ and $C_A$ nuclei, the Cephalosporin C, $C_c$ and $C_A$ nuclei respectively are treated with phenylacetyl chloride.

The following examples illustrate the invention:

EXAMPLE 1

*Preparation of the Cephalosporin C nucleus*

Cephalosporin C sodium salt (2 g.) was dissolved in 30 ml. water, the pH adjusted to 2.5 by addition of Dowex 50×8 (H+), the resin filtered and washed with 10 ml. water, and 10.2 ml. N HCl added to the combined filtrate and washings. The solution was kept at 20° for 3 days and added to a column of Dowex-1 (acetate form), 2.1 cm. diam.×7 cm. The percolate was collected in 5 ml. fractions (1 to 12) and the column was eluted with water until a total of 34 fractions had been collected. Elution was then begun with 0.5 N acetic acid and a further 66 fractions collected. The optical density at 260 m$\mu$ was measured for each fraction.

Fractions 2–16 were pooled and concentrated in vacuo when Cephalosporin $C_c$ (312 mg.) separated in crystalline form. Fractions 36–45 contained most of the Cephalosporin C nucleus, which yielded an active phenylacetyl derivative. These fractions were pooled and freeze dried (40 mg.). On phenylacetylation this material yielded 250 units of activity against Staph. aureus per mg. of original product.

The new compound was further purified by electrophoresis of the appropriate fraction from the Dowex-1 (acetate) column. Electrophoresis was carried out in a Beckman/spinco Model CP continuous flow paper electrophoresis cell. The buffer used was made by adding pyridine to 0.05 N-acetic acid until the pH rose to 4.0. The cell was run at constant current (40 ma.), the potential being 880 v. The sample, in 20 ml. buffer, was fed to the curtain during 24 hours and 32 fractions were collected, the fractions being numbered from cathode (1) to anode (32). The volume of each fraction was about 12 ml. At the end of the experiment the paper curtain was sprayed with ninhydrin. This revealed a strong band of material with very little mobility which flowed off the curtain in fractions 13–15, a band of strongly acidic material which had flowed into the anode wick, and a faint band of a product (corresponding to α-aminoadipic acid) which had migrated towards the anode and flowed off the curtain in fraction 24.

To determine the position of the new compound 10 x 10 $\mu$l. spots from each fraction were applied to paper and the paper was sprayed with M-pyridine in 50% acetone and then with 2% phenylacetyl chloride in acetone. After contact of the paper with plates seeded with Staph. aureus and incubation of the plates, a large zone of inhibition was found in a position corresponding to fraction 22 and a smaller one in a position corresponding to fraction 23.

Freeze-drying of fraction 22 yielded a residue which was too small to be weighed accurately. In aqueous solution the ultraviolet absorption spectrum of the product showed a plateau at 260 m$\mu$, and its total weight (43 $\mu$g.) was estimated from the extinction at this wavelength on the assumption that the molecular weight of the substance was that of 7-amino-cephalosporanic acid and that its molecular extinction was the same as that of Cephalosporin C. The product was phenylacetylated in aqueous acetone containing phosphatae buffer, pH 6.5. The activity of the phenylacetyl derivative against Staph. aureus corresponded to 1450 units per mg. of original product. Cephalosporin C shows an activity of 8–10 units per mg. against the same organism.

The amino group in 6-aminopenicillanic acid (penicillin nucleus) shows a relatively weak basicity, the isoelectric point of the compound being reported to be at pH 4.3 (Batchelor, Doyle, Naylor and Rolinson, 1959). This is readily understandable, since the amino group is β to both a CON grouping and a CH—S— grouping. For similar reasons the amino group of 7-aminocephalosporanic acid should be weakly basic and the substance should migrate towards the anode at pH 7. The properties of the new compound from Cephalosporin C (described in columns 2 and 3) indicated that it was in fact 7-amino-cephalosporanic acid.

EXAMPLE 2

*Preparation of the 7-phenylacetamidocephalosporanic acid*

Cephalosporin C sodium salt was treated with dilute hydrochloric acid at room temperature in the manner already described. The resulting solution, containing 7-aminocephalosporanic acid and other products of mild acid degradation of Cephalosporin C, was neutralized and buffered at pH 7.0 with sodium bicarbonate solution in an atmosphere of $CO_2$. Phenylacetyl chloride (1.2 equiv., based on the amount of Cephalosporin C used) in acetone was slowly added to the neutral solution, which had been cooled to 0° and mixed with sufficient acetone to make the final acetone concentration 50% after the addition of the phenylacetyl chloride solution. After one hour the pH of the mixture was then adjusted to 5.0 (glass electrode), and acetone was removed in vacuo. The pH was then lowered to 2.0 and the 7-phenylacetamido-cephalosporanic acid, together with N-phenacetylcephalosporin $C_c$ and N-phenylacetylcephalosporin C, were extracted into butyl acetate. The butyl acetate was separated and back extracted with water which was brought to pH 5.0, at equilibrium, by the addition of alkali. The aqueous extract was freeze-dried. When a portion of the product (150 $\mu$g.) was chromatographed on paper in n-butanol-ethanol-water (4:1:5 by vol.) it was found to contain three components active against Staph. aureus (see FIG. 1). The major active component was 7-phenylacetamidocephalosporanic acid. The other active components were N-phenylacetylcephalosporin $C_c$ and N-phenylacetylcephalosporin C, both of which had been extracted only in part by the butyl acetate.

The 7-phenylacetamidocephalosporanic acid was separated from the other active components of the crude mixture (17 units/mg. against Staph. aureus), by chromatography on a Grycksbo paper roll column (LKB-Produkter-Sweden), and by counter current distribution.

Elution from the paper column was carried out with n-butanol saturated with water. In a preliminary experiment the sodium salt of 7-phenylacetamidocephalosporanic acid was obtained from the paper column as a powder having an activity of 167 units/mg. This material was clearly far from pure.

Preliminary counter current distributions were carried out in two solvent systems. The first system consisted of equal volumes of butyl acetate and 1% acetic acid (solvent I) and the second of n-butanol and 0.05 M sodium phosphate buffer pH 6.0 (solvent II). After eight transfers in solvent I (10 ml. top layer and 20 ml. bottom layer) the concentration of 7-phenylacetamidocephalosporanic acid reached a maximum between tubes 6 and 7 while the other active components were found in tubes 0 and 1. Material recovered from tubes 5, 6 and 7 assayed approximately 50 units/mg. Paper chromatography of this material in n-butanol-water-ethanol (4:5:1 by vol.) indicated that 7-phenylacetamidocephalosporanic acid was the only active substance that was present.

After 8 transfers in solvent II (20 ml. each layer), the sodium phenylacetamidocephalosporanate showed a peak between tubes 3 and 4 but the bulk of the remainder of the active material had remained in tube 0.

7-phenylacetamidocephalosporanic acid moved towards the anode at almost the same rate as penicillin G when subjected to electrophoresis on paper in collidine acetate buffer, pH 7.0. On incubation with aqueous pyridine at 37°, phenylacetamidocephalosporanic acid was partly converted to an active derivative of the Cephalosporin $C_A$ (pyridine) type. This derivative behaved as a neutral substance when subjected to electrophoresis at pH 7.0.

7-phenylacetamidocephalosporanic acid (about 10 $\mu$g.) was not significantly inactivated by a solution of penicillinase which contained ten times the amount of enzyme shown to completely inactivate 50 μg. of penicillin G under similar conditions.

The activity of 7-phenylacetamidocephalosporanic acid (benzyl cephalosporin) against a variety of bacteria has been examined using the tube dilution technique. The organisms were grown in nutrient broth, except where otherwise stated, the tubes, containing 2 ml. medium, were inoculated with 0.1 ml. of a 1/100 dilution of an overnight broth culture and incubated at 37° C. for 48 hours. The results are expressed as minimum inhibitory concentration in μg./ml.

greater distance than Cephalosporin C itself migrates towards the anode in the same experiment. It remains in the neutral position on electrophoresis at pH 7. This behavior is consistent with the properties expected of the Cephalosporin $C_A$ (pyridine) nucleus. (See section 9 of definition of Cephalosporin C nucleus fraction.) A compound with the same properties was formed on incubation of Cephalosporin C nucleus with 2 M-pyridine acetate pH 7 for 16 hours and on phenylacetylation yielded an active phenylacetyl derivative. The properties of the Cephalosporin $C_A$ (pyridine) nucleus were in-

| Organism | Strain | Medium | Minimum Inhibitory Concentration in μg./ml. |
|---|---|---|---|
| Staph. aureus | 1 | Nutrient Broth | 0.28 |
|  | 2 | do | 0.07 |
|  | 3 | do | 0.28 |
|  | 4 | do | 0.14 |
|  | 5 | do | 0.38 |
|  | 6 | do | 0.38 |
|  | *7 | do | 1.14 |
|  | *8 | do | 0.57 |
|  | 9 | do | 0.57 |
|  | 10 | do | 1.14 |
|  | 11 | do | 0.28 |
|  | *12 | do | 1.14 |
|  | 13 | do | 0.57 |
|  | 14 | do | 2.28 |
|  | 15 | do | 0.28 |
|  | *16 | do | 0.56 |
|  | 17 | do | 0.28 |
|  | *18 | do | 1.14 |
|  | *19 | do | 0.57 |
|  | 20 | do | 0.75 |
|  | *21 | do | 3.0 |
|  | *22 | do | 3.0 |
|  | 23 | do | 3.0 |
| Micrococcus flavus |  | do | 0.56 |
| Sarcina lutea |  | do | 2.2 |
| Streptococcus haemolyticus | 1 | Brain heart infusion+10% serum. | 0.14 |
|  | 2 | do | 0.28 |
|  | 3 | do | 0.14 |
| Streptococcus agalactiae |  | do | 0.14 |
| Streptococcus dysgalactiae |  | do | 0.07 |
| Corynebacterium pyogenes |  | Nutrient broth+10% serum | 0.07 |
| Corynebacterium coryzae |  | do | 0.14 |
| Bacillus subtilis |  | Nutrient broth | 0.07 |
| Bacillus megatherium |  | do | 0.56 |
| Neisseria catarrhalis | 1 | Nutrient broth+10% serum | 0.28 |
|  | 2 | do | 0.28 |
| Haemophilus pertussis | 1 | Bordet gengou agar+10% sheep blood. | >15 |
|  | 2 | do | >15 |
|  | 3 | do | >15 |
| Escherichia coli | 1 | Nutrient broth | 61 |
| Aerobacter aerogenes | 2 | do | >122 |
| Klebsiella pneumoniae |  | do | 15 |
| Salmonella typhi |  | do | 7.5 |
| Salmonella typhimurium |  | do | 61 |
| Salmonella meleagidis |  | do | 122 |
| Salmonella heidelburg |  | do | >122 |
| Shigella flexneri |  | do | >122 |
| Proteus vulgaris |  | do | >122 |
| Vibrio cholerae |  | do | 1.5 |
| Saccharomyces cerevisiae |  | Nutrient broth+2% glucose | >122 |
| Leptospira pomona |  | Korthof's+10% serum | 20 |
| Leptospira icterohaemorrhagiae |  | do | 10 |

Strains of *Staphylococcus aureus* marked * are resistant to more than 200 μg./ml. of benzylpenicillin.

EXAMPLE 3

*Preparation of Cephalosporin $C_A$ (pyridine) nucleus from Cephalosporin $C_A$ (pyridine)*

Cephalosporin $C_A$ (pyridine) is kept in 0.1 N- or N HCl at room temperature for 3 or more days. When the products of this reaction are analysed by electrophoresis on paper in pyridine acetate buffer (pH 4.0) followed by contacting the paper with agar plates seeded with *Staph. aureus* a single active zone due to unchanged Cephalosporin $C_A$ (pyridine) is revealed at the concentration used. Cephalosporin $C_A$ (pyridine) behaves as though it has no net charge at pH 4.0. However, duplicate paper strips, which have been sprayed with M-pyridine in 50% aqueous acetone and 0.125% phenylacetyl chloride in dry acetone, reveal an additional active zone on the seeded plates due to the product of phenylacetylation of the Cephalosporin $C_A$ (pyridine) nucleus. The Cephalosporin $C_A$ nucleus behaves as a base at pH 4.0. It migrates towards the cathode a somewhat vestigated and found to coincide with those as hereinbefore described for it.

EXAMPLE 4

*Preparation of Cephalosporin $C_c$ nucleus*

Cephalosporin C (50 mg.) was held in N- or 0.5 N HCl (1.33 ml.) at 20° for 2 or 3 days. Under these conditions the 7-aminocephalosporanic acid, which was present in the N HCl solution after 24 hours, had disappeared after three days. After four days the active zone revealed by phenylacetylation of the Cephalosporin $C_c$ nucleus was still close to the maximum value, but only traces of Cephalosporin $C_c$ remained. Cephalosporin $C_c$ nucleus thus appears to be the relatively acid-stable end product of a series of active or potentially active derivatives formed by treatment of Cephalosporin C with acid under mild conditions.

Cephalosporin $C_c$ nucleus was also formed when Cephalosporin C was kept in contact with an equal weight of wet Dowex 50×8 (—H⁺) ion exchange resin for 15–48 hours at 20°. Duplicate strips from ionograms run in pyridine acetate buffer, pH 4.5, which were either sprayed with phenylacetylchloride and contacted with a test organism or sprayed with ninhydrin, revealed that the position of the Cephalosporin $C_c$ nucleus corresponded with a yellow zone on the ninhydrin sprayed strips.

The activity of the Cephalosporin $C_c$ nucleus formed from 400 μg. Cephalosporin $C_c$ by treatment with N HCl was not appreciably affected by the action of penicillinase under conditions which completely destroyed 50 μg. of penicillin G.

EXAMPLE 5

(a) *Acylation of 7-aminocephalosporanic acid on paper*

Samples (each 200 μg.) of a crude preparation of Cephalosporin C nucleus were subjected to electrophoresis on paper for 2 hours at 14 volt/cm. in pyridine acetate buffer, pH 4.5. Strips of paper along which each sample had migrated were then cut out and each was sprayed first with M-pyridine in 50% (v./v.) acetone, and then with a solution of a particular acid chloride (0.1 ml.) in acetone (8 ml.). The paper strips were placed on plates seeded with *Staph. aureus* and bioautographs prepared in the manner described in Example 1. The inhibition zones were at the same distance from the origin (1.6 cm. towards the anode) in each case, their positions corresponding to the migration of the Cephalosporin C nucleus. In this way, the phenylacetyl, phenoxyacetyl, n-propionyl, acetyl and isobutyryl derivatives of the Cephalosporin C nucleus were prepared. The zones due to the phenylacetyl and phenoxyacetyl derivatives of the nucleus were about 3.5 cm. in diameter. The zone due to the propionyl derivative was about 2 cm. in diameter. Zones due to the acetyl and isobutyryl derivatives were definite, but very small.

(b) *Acylation of 7-aminocephalosporanic acid in solution*

A sample (4 mg.) of crude Cephalosporin C nucleus was dissolved in 50 μl. of a solution made by adding 1 ml. pyridine to 5 ml. water. To samples (10 μl.) of the nucleus solution were added 10 μl. of a solution of a particular acid chloride in acetone. (The acid chloride solutions were made by adding 0.68 ml. of phenoxyacetyl chloride, 0.62 ml. of phenylacetyl chloride, 0.56 ml. of benzoyl chloride and 0.37 ml. of n-propionyl chloride respectively to 10 ml. of acetone.) The mixtures were kept for 15 minutes at room temperature, diluted if necessary, and 5 μl. samples then spotted on to paper for electrophoresis or chromatography.

Paper chromatograms were run at room temperature in ethyl acetate saturated with aqueous sodium acetate buffer (0.1 M to sodium), pH 5.4. The paper was pretreated by soaking in the buffer, blotting, and hanging in a stream of air at room temperature, and was used as soon as it was dry. With this system the solvent front reached the bottom of the paper in about 3 hours, but the chromatogram was allowed to continue running for 18 hours.

The activity of the acyl derivatives was measured against *Staphylococcus aureus*. The activity of the phenoxyacetyl derivative was found to be similar to the activity of the phenylacetyl derivative, the activity of the n-propionyl derivative to be considerably smaller and the benzoyl isobutyryl and acetyl derivatives to have a definite but small activity.

All these derivatives were found to migrate a similar distance towards the anode when they were subjected to electrophoresis on paper at pH 4.5 and their position revealed by making bioautographs. The distance was similar to that migrated by Cephalosporin C and by benzylpenicillin.

The phenylacetyl, phenoxyacetyl and n-propionyl derivatives of the Cephalosporin C nucleus could be distinguished from each other by paper chromatography in the ethyl acetate-sodium acetate buffer system described by Hale, Miller and Kelly (Nature 1953, 172, 545). Table 1 shows the $R_F$ values of the various derivatives relative to that of benzylpenicillin (the phenylacetyl derivative of 6-aminopenicillanic acid). The relative $R_F$ values are denoted by the symbol $R_{Phenylacetyl-6-APA}$.

TABLE 1

| Derivative: | $R_{Phenylacetyl-6-APA}$ |
|---|---|
| n-Propionyl-7ACA | 0.18 |
| Phenylacetyl-7ACA | 0.46 |
| Phenoxyacetyl-7ACA | 0.51 |
| n-Propionyl-6-APA (ethylpenicillin) | 0.43 |
| Phenylacetyl-6-APA (benzylpenicillin) | 1.00 |
| Phenoxyacetyl-6-APA (phenoxymethylpenicillin) | 1.07 |
| α-Phenoxypropionyl-6-APA (α-phenoxyethylpenicillin) | 1.20 |

The N-acyl derivatives of 7-aminocephalosporanic acid reacted with aqueous pyridine, in the region of pH 7, to form active compounds of the $C_A$ type (III). These $C_A$ compounds behaved as though they had no net charge on electrophoresis on paper at pH 4.5 or pH 7.0, whereas the N-acyl derivatives themselves migrated towards the anode.

We claim:

1. A compound selected from the group consisting of the nucleus of Cephalosporin C having the structure

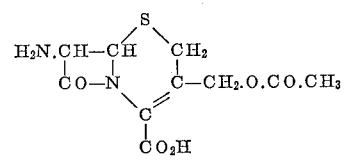

and the sodium, potassium, ammonium and mineral acid addition salts thereof.

2. A compound selected from the group consisting of the nucleus of Cephalosporin $C_c$ having the structure

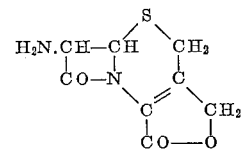

and mineral acid addition salts thereof.

3. A compound selected from the group consisting of the nucleus of a Cephalosporin $C_A$ compound having the structure

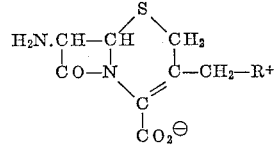

in which R represents a heterocyclic weak tertiary base having a cyclic structure containing at least one nitrogen heteroatom and which is linked to $CH_2$ via a nitrogen heteroatom, and mineral acid addition salts thereof.

4. A compound selected from the group consisting of the nucleus of Cephalosporin $C_A$ (pyridine) having the structure

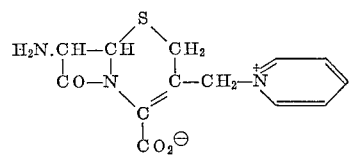

and mineral acid addition salts thereof.

5. A compound of the formula:

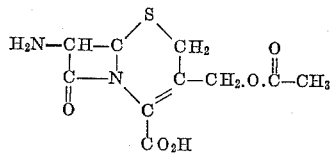

6. The hydrochloride of the compound of claim 5.

References Cited by the Examiner

UNITED STATES PATENTS

| | | | |
|---|---|---|---|
| 2,941,995 | 6/60 | Doyle et al. | 260—239.1 |
| 3,049,541 | 8/62 | Abraham et al. | 260—243 |
| 3,117,126 | 1/64 | Hoover et al. | 260—243 |
| 3,124,576 | 3/63 | Stedman | 260—243 |

OTHER REFERENCES

Abraham, E. P.: Pharmacological Reviews, vol. 14, No. 4, pp. 473–500 (pages 480–486 relied on), December 1962.

Hachh's, Chemical Dictionary, page 805 (Second edition), 1937.

Jour. American Medical Assoc., page 466, May 24, 1958.

Newton et al.: Nature, vol. 175, page 548, Mar. 26, 1955.

Wertheim: Textbook of Organic Chemistry, pages 763–764 (1945).

NICHOLAS S. RIZZO, *Primary Examiner.*

HERBERT J. LIDOFF, *Examiner.*